Patented June 5, 1951

2,556,111

UNITED STATES PATENT OFFICE 2,556,111

PROCESS FOR PREPARING DRIED MOLASSES

Earl O. Sargent, Des Moines, Iowa

No Drawing. Application June 13, 1949,
Serial No. 98,874

7 Claims. (Cl. 99—6)

This invention relates generally to stock and poultry feeds and in particular to a product of molasses or a fish soluble in a pure dried form and the process for preparing the same.

The food values in molasses and fish solubles for stock and poultry feeds are generally recognized by feed manufacturers. However, each of these materials, in their normal form, is difficult to handle and to mix with other feeds, due to their sticky and adhesive characteristics and their tendency to become sluggish and substantially nonpourable at temperatures of about forty degrees Fahrenheit (40° F.). Further, in the use of these materials in feed plants or warehouses, it is necessary that they be at temperatures around fifty degrees Fahrenheit (50° F.). As a result, their storage must either take place in a heated room or in a vat buried at an appreciable depth below ground level. Also, when these materials are mixed in their original forms in a feed, they are usually subjected to heat to permit their free flow into a mixing hopper.

Attempts to overcome these objections have been made, as exemplified by U. S. Patent #2,197,319, in which a black strap molasses was treated by being mixed with chilled water and a finely divided porus feed ingredient and the resultant mixture dried and then finely ground. Although the dried molasses thus attained is generally satisfactory, it is not in a pure form since it includes a carrier, and is not in a completely dry form and at times becomes lumpy. Stated otherwise, portions of the molasses product of this process oftentimes remain in a lump that remains free of other feed ingredients with which it is mixed.

It is an object of this invention, therefore, to provide an improved process for preparing a molasses, a fish soluble or the like, in a finely divided pure, dry form adapted to be readily handled or mixed with other feed ingredients.

Yet another object of this invention is to provide a molasses or a fish soluble in a pure dried form.

A further object of this invention is to provide a method for preparing molasses, or a fish soluble, in a dried, finely divided form without the use of any carrier.

A feature of this invention is found in the provision of a process for preparing molasses or a fish soluble in a dried, finely divided pure form which consists in mixing water with one of such materials in an equal ratio, or in the ratio of 1:2, either way, by volume, cooling the mixture to a temperature at which the mixture is still pourable, then drying the mixture to remove excess moisture therefrom, and then finally grinding the mixture into a finely, divided form.

Yet another feature of this invention is found in the provision of a method of preparing molasses or a fish soluble in a dried pure form which consists in mixing one of such materials with water, in equal amounts by volume, chilling the resultant mixture to thirty-two degrees Fahrenheit (32° F.), drying the mixture to remove substantially all excess moisture therefrom, and then finely dividing the same.

Further objects, features and advantages of this invention will appear from the following description:

The method of this invention has been applied successfully to black strap molasses, table sirups and molasses and fish solubles, which latter product is a partially dehydrated fish press water. Insofar as the molasses and sirups are concerned, the sugar content in these products apparently does not in any way affect the resultant dried product.

In the practice of this invention, molasses has been mixed with water in equal amounts and the resultant mixture chilled to temperatures ranging from forty degrees Fahrenheit (40° F.) to twenty-six degrees Fahrenheit (26° F.) The flow of the mixture became less free with a decrease in temperature, but, conversely, the solubility of the molasses in the water apparently increased with a decrease in temperature. In drying, it was found that this mixture, progressively from the highest cooling temperature to the lowest cooling temperature, required progressively shorter drying periods to remove the excess moisture therefrom.

Also, the mixture, progressively from the highest cooling temperature to the lowest cooling temperature, was found to be more readily ground into finely, divided particles, and the resultant dried product was more freely flowable, namely, the individual particles were more free of each other and approached the flow and handling characteristics of a dry sand.

With the ratio of the mix changed to four parts of molasses to two parts of water by volume, the resultant mixture, when cooled over a temperature range from 40° F. to 26° F., was found to be more sluggish in flow than the 4:4 mix. Although shorter drying periods were required for the 4:2 mix, the particles of the resultant products, which were generally satisfactory, tended to cling together. However, on being shaken or vibrated, the product was readily broken up to a uniform texture.

A satisfactory dried molasses product was also obtained with the ratio of four parts of water to two parts of molasses by volume when cooled from temperatures of 40° F. to 26° F. The resultant mixture required a longer drying period, relative to the 4:4 mixture, but upon being dried and ground was found to have characteristics more similar to those of the 4:4 mix, than to the mix of four parts of molasses to two parts of water.

The practice of this invention in connection with fish solubles was found to be substantially similar to its practice relative to molasses, except that the mixture of water and fish soluble tends to become sluggish and nonpourable at temperatures of around 26° F. Fish solubles alone become sluggish at 45° F. and are practically nonpourable at 40° F.

Thus, a mix of four parts of water to four parts of fish soluble by volume when cooled to 30° F. flowed freely, and on being dried and then ground, gave a resultant product, the particles of which were nonclinging and freely separable.

With a mix of four parts of solubles to two parts of water chilled to 32° F., the resultant mixture, although thick, was pourable. The drying period required for this mixture was shorter than that for the 4:4 mix, but the particles of the resultant dried and ground product were not as freely separable as those in the 4:4 mix.

When four parts of soluble were mixed with six parts of water by volume, and then chilled to 32° F., the mixture poured or flowed freely, but required a longer drying period than the 4:4 mix. However, this mixture, on being dried, was easily grindable and the resultant product had essentially the same characteristics of the product resulting from the 4:4 mix.

Where fish press water was used in place of a fish soluble, it was found that in some instances the water content in the press water was sufficiently high so as to eliminate the necessity of adding any further water thereto. In such cases a satisfactory resultant dried fish soluble product was obtained by merely chilling the press water to about 32° F. and then drying and grinding the same.

Although the food value characteristics of molasses and fish solubles are generally known, the specific chemical composition of these materials are not generally known or available. However, in the practice of this invention, molasses and fish solubles appear to undergo a similar chemical reaction, when mixed with water and then chilled, that prevents any return to their original form, and in particular the chemical characteristic imparting adhesiveness or stickiness to these materials is apparently removed.

An interesting fact discovered in the practice of this invention was the very appreciable lessening of the odor of the dried fish solubles as compared to the disagreeable odor of the original liquid fish solubles. As a result, the dried fish soluble was not only reduced to a form providing for its more convenient handling and mixing with other feeds, but a marked lessening of its odor, relative to the odor of the liquid fish soluble, removed a very objectionable factor to its use in seed plants, located in populated territories, and to its more general use as a feed for livestock and poultry.

In further connection with the method of this invention, it appears that the chilling of a mixture of water and a molasses of fish soluble, to a temperature less than 40° F. and above a temperature at which the mixture becomes non-pourable, has more to do with the chemical reaction in these materials to remove the sticky or adhesive characteristics therein, than the particular ratio of mix of these materials with water. Also, with the range of mix ratios, above described, it appeared that the lower the temperature to which the mix was chilled, the shorter was the drying period required to remove excess moisture from the mix. The process thus provides for a flexibility in the manufacture of a dried molasses or fish soluble in that the chilling and drying periods are relatively variable.

Insofar as molasses and a fish soluble are concerned there is no established pour point temperature. As a result the term "pourable," as used herein, denotes a fluidity such that the material is free flowing through a usual pipe line system adapted to conduct the liquid for manufacturing purposes.

So far as is known, applicant is the first one to produce a molasses or a fish soluble in a pure dried form, namely, free of any carrier, and with the resultant product retaining in full the food values of the original product. Since this resultant product is entirely free of any carrier, it can be incorporated in any desired known feed mixture by direct proportioning and with the elimination of any excess weight which would be incurred, as by the product disclosed in U. S. Patent 2,197,319, wherein a carrier is included. It will be appreciated also, that in the shipping of the product of this invention, freight costs for its transportation are reduced, for a given weight and volume of dried molasses or fish soluble, because the carrier is eliminated.

In carrying out the method of this invention atmospheric drying or vacuum drying may be used with equally satisfactory results. The drying temperature should always be below a temperature which would coke or burn the mixture, since any coking or burning would impair the vitamin content of the resultant product. At the beginning of a drying operation, a relatively high temperature of about 350° F. may be used, but, as the drying operation approaches completion, the heating temperature should be reduced to about 150° F. To facilitate the blending of the water with a molasses or a fish soluble, the mixture may be agitated for a short period of time after the temperature thereof has been reduced to its lowest chilling temperature.

Although the invention has been described with respect to molasses, it is to be understood this term includes table sirups and molasses, black strap molasses, corn molasses, beet and citrus molasses and the like. Further, although the invention has been described with respect to a preferred method for the manufacture of a molasses or fish soluble in a pure dried form, it is to be understood that it is not to be so limited, since changes can be made therein which are within the full intended scope of this invention, as defined by the appended claims.

I claim:

1. The process for preparing a molasses in a pure dried, particle form which consists in mixing water with a molasses chilling the resultant mixture to a temperature of between 26° F. to 40° F., drying the mixture to remove excess moisture therefrom, and then grinding the dried mixture into particles.

2. The process for preparing a molasses in a pure dried, particle form which consists in mixing water with molasses within a range of 2:1 either way, by volume, cooling the resultant mixture to a temperature less than of 40° F., drying the mixture to remove excess moisture therefrom, and then grinding the dried mixture into particles.

3. The process for preparing a molasses in a pure dried particle form which consists in mixing water with molasses in substantially equal amounts by volume, cooling the resultant mixture to a temperature of about 32° F., drying this mixture to remove excess moisture therefrom, and then grinding the mixture into particles.

4. The process for preparing fish press water in a pure dried particle form which consists in cooling the fish press water to a temperature of less than 40° F., drying the fish press water to remove excess moisture therefrom, and then grinding the same into particles.

5. The process for preparing a fish soluble in a pure dried, particle form which consists in mixing water with a fish soluble, chilling the resultant mixture to a temperature of less than 40° F., drying the mixture to remove the excess moisture therefrom, and then grinding the dried mixture into particles.

6. The process for preparing a fish soluble in a pure dried, particle form which consists in mixing water with a fish soluble within a range of 2:1 either way, by volume, cooling the resultant mixture to a temperature of less than 40° F., drying the mixture to remove excess moisture therefrom, and then grinding the dried mixture into particles.

7. The process for preparing a fish soluble in a pure dried, particle form which consists in mixing water with a fish soluble in substantially equal amounts by volume, cooling the resultant mixture to a temperature of about 32° F., drying this mixture to remove excess moisture therefrom, and then grinding the mixture into particles.

EARL O. SARGENT.

REFERENCES CITED

The following references are of record in the file of this patent:

UNITED STATES PATENTS

| Number | Name | Date |
| --- | --- | --- |
| 1,548,293 | Wilkins | Aug. 4, 1923 |
| 2,197,319 | Sargent | Aug. 16, 1940 |
| 2,333,638 | Chalkley | Nov. 9, 1943 |